(12) United States Patent
Perez et al.

(10) Patent No.: US 11,739,654 B2
(45) Date of Patent: Aug. 29, 2023

(54) ABRADABLE LABYRINTH SEAL FOR REFRIGERANT COMPRESSORS

(71) Applicant: Danfoss A/S, Nordborg (DK)

(72) Inventors: Alonso Perez, Fort Lauderdale, FL (US); Lin Xiang Sun, Tallahassee, FL (US); Jin Yan, Tallahassee, FL (US); Tianlei Li, Tallahassee, FL (US)

(73) Assignee: Danfoss A/S

( * ) Notice: Subject to any disclaimer, the term of this patent is extended or adjusted under 35 U.S.C. 154(b) by 144 days.

(21) Appl. No.: 17/422,407

(22) PCT Filed: Feb. 21, 2020

(86) PCT No.: PCT/US2020/019192
§ 371 (c)(1),
(2) Date: Jul. 12, 2021

(87) PCT Pub. No.: WO2020/176339
PCT Pub. Date: Sep. 3, 2020

(65) Prior Publication Data
US 2022/0120189 A1 Apr. 21, 2022

Related U.S. Application Data

(60) Provisional application No. 62/810,053, filed on Feb. 25, 2019.

(51) Int. Cl.
*F01D 11/12* (2006.01)
*F01D 11/02* (2006.01)
(Continued)

(52) U.S. Cl.
CPC ............ *F01D 11/122* (2013.01); *F01D 11/02* (2013.01); *F01D 15/005* (2013.01); *F16J 15/447* (2013.01); *F25B 31/00* (2013.01); *F05D 2240/55* (2013.01)

(58) Field of Classification Search
CPC ............ F16J 15/00; F16J 15/44; F16J 15/447; F16J 15/4472; F16J 15/4474; F16J 15/4476;
(Continued)

(56) References Cited

U.S. PATENT DOCUMENTS 3,537,713 A * 11/1970 Matthews .............. F16J 15/445
277/936
4,152,092 A 5/1979 Swearingen
(Continued)

FOREIGN PATENT DOCUMENTS

JP 2014074360 4/2014

OTHER PUBLICATIONS

International Preliminary Report on Patentabiity for PCT/US2020/019192 dated Sep. 2, 2021.
International Search Report and Written Opinion for PCT/US2020/019192 dated May 26, 2020.

*Primary Examiner* — Nathan Cumar
(74) *Attorney, Agent, or Firm* — Carlson, Gaskey & Olds, P.C.

(57) ABSTRACT

A compressor according to an exemplary aspect of the present disclosure includes, among other things, a rotor configured to rotate with respect to a stator, the stator having an abradable portion. At least one labyrinth seal is between the rotor and the stator, wherein the labyrinth seal comprises a plurality of teeth extending from the rotor toward the abradable portion.

24 Claims, 4 Drawing Sheets

(51) Int. Cl.
*F01D 15/00* (2006.01)
*F16J 15/447* (2006.01)
*F25B 31/00* (2006.01)

(58) Field of Classification Search
CPC ....... F16J 15/4478; F01D 11/00; F01D 11/02;
F01D 11/025; F01D 11/04; F01D 11/06;
F01D 11/08; F01D 11/12; F01D 11/122;
F01D 11/125; F01D 15/00; F01D 15/005;
F05D 2240/00; F05D 2240/55; F05D
2240/56; F05D 2240/57; F05D 2240/58;
F05D 2240/581; F25B 31/00
USPC ......................................................... 277/412
See application file for complete search history.

(56) References Cited

U.S. PATENT DOCUMENTS

| | | | |
|---|---|---|---|
| 4,523,896 A | | 6/1985 | Lhenry et al. |
| 4,997,340 A | * | 3/1991 | Zinsmeyer .......... F04D 29/0516 |
| | | | 415/105 |
| 5,297,928 A | * | 3/1994 | Imakiire ............... F04D 29/162 |
| | | | 415/174.3 |
| 5,908,195 A | * | 6/1999 | Sharrer ................ F16J 15/4474 |
| | | | 277/420 |
| 7,445,213 B1 | | 11/2008 | Pelfrey |
| 2009/0205362 A1 | * | 8/2009 | Haley ................. F04D 27/0246 |
| | | | 29/889.4 |
| 2013/0011245 A1 | | 1/2013 | Wiebe |
| 2018/0156337 A1 | | 6/2018 | Daussin et al. |

* cited by examiner

US 11,739,654 B2

ABRADABLE LABYRINTH SEAL FOR REFRIGERANT COMPRESSORS

PRIORITY CLAIM

This application claims the benefit of U.S. Provisional Application No. 62/810,053, filed on Feb. 25, 2019.

BACKGROUND

Refrigerant compressors are used to circulate refrigerant in a chiller via a refrigerant loop. Refrigerant loops are known to include a condenser, an expansion device, and an evaporator. The compressor compresses the fluid, which then travels to a condenser, which in turn cools and condenses the fluid. The refrigerant then goes to an expansion device, which decreases the pressure of the fluid, and to the evaporator, where the fluid is vaporized, completing a refrigeration cycle.

Many refrigerant compressors are centrifugal compressors and have an electric motor that drives at least one impeller to compress refrigerant. The fluid is then directed downstream for use in the chiller system. Known refrigerant compressors have seals.

SUMMARY

Figure 1:
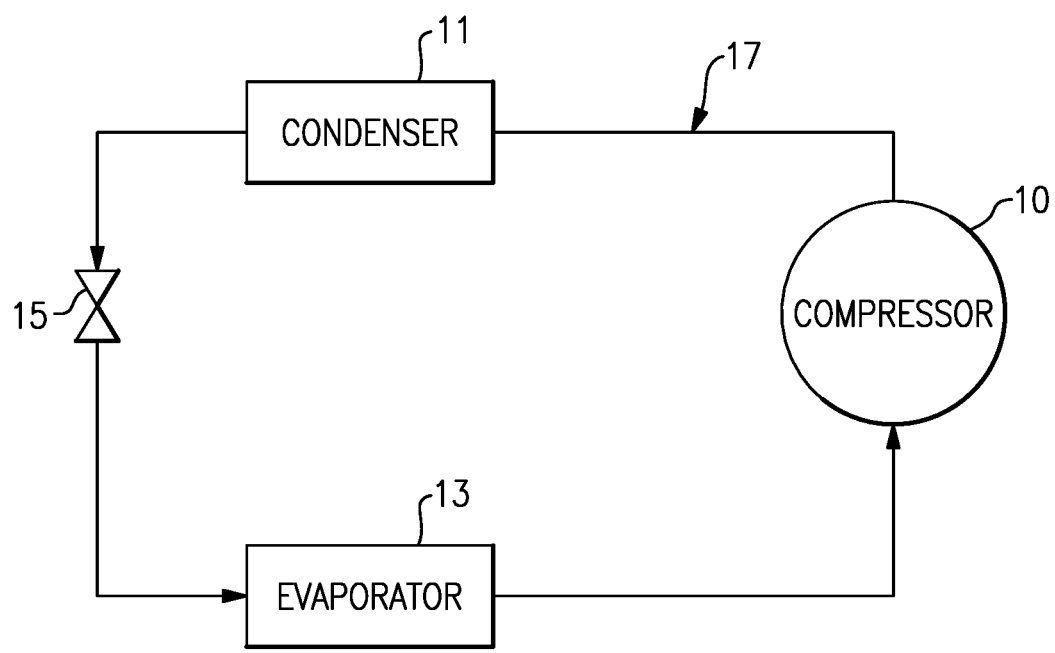
FIG. 1 is a schematic illustration of a refrigerant loop.

A compressor according to an exemplary aspect of the present disclosure includes, among other things, a rotor configured to rotate with respect to a stator, the stator having an abradable portion. At least one labyrinth seal is between the rotor and the stator, wherein the labyrinth seal comprises a plurality of teeth extending from the rotor toward the abradable portion.

In a further embodiment, the plurality of teeth are provided in a stepped arrangement.

In a further embodiment, the plurality of teeth are arranged in three groups separated by radial steps.

In a further embodiment, the abradable portion is made of one of PTFE, polyamide, and a low strength alloy.

In a further embodiment, the teeth are configured to contact the abradable portion and carve tracks into the abradable portion over time.

In a further embodiment, a flow path is defined through the labyrinth seal and a discharge path is arranged downstream of the labyrinth seal.

In a further embodiment, a flow path is defined through the labyrinth seal and a debris trap is arranged downstream of the labyrinth seal.

In a further embodiment, the labyrinth seal is arranged at a first location, and a second labyrinth seal is arranged at a second location between the rotor and the stator.

In a further embodiment, the rotor comprises an impeller, the stator is a housing, and the labyrinth seal is arranged between an outer diameter of the impeller and the housing.

In a further embodiment, the rotor comprises an impeller and the labyrinth seal is arranged at an inner diameter of the impeller.

In a further embodiment, the rotor rotates on a shaft that is driven by a motor.

In a further embodiment, the compressor is a two stage compressor.

In a further embodiment, the compressor is used in a heating, ventilation, and air conditioning (HVAC) chiller system.

A refrigerant system according to an exemplary aspect of the present disclosure includes, among other things, a main refrigerant loop including a compressor, a condenser, an evaporator, and an expansion device. The compressor includes a rotor configured to rotate with respect to a stator, the stator having an abradable portion. At least one labyrinth seal is between the rotor and the stator, wherein the labyrinth seal comprises a plurality of teeth extending from the rotor toward the abradable portion.

In a further embodiment, the plurality of teeth are provided in a stepped arrangement.

In a further embodiment, the plurality of teeth are arranged in at least two groups separated by radial steps.

In a further embodiment, the teeth are configured to contact the abradable portion and carve tracks into the abradable portion over time.

In a further embodiment, a flow path is defined through the labyrinth seal and at least one of a discharge path and a debris trap is arranged downstream of the labyrinth seal.

In a further embodiment, a second labyrinth seal is between the rotor and the stator.

In a further embodiment, the compressor is a two stage centrifugal compressor.

DETAILED DESCRIPTION

FIG. 1 illustrates a refrigerant system. The refrigerant system includes a compressor 10, a condenser 11, an evaporator 13, and an expansion device 15 arranged in a main refrigerant loop, or circuit, 17. This refrigerant system may be used in a chiller, for example. In that example, a cooling tower may be in fluid communication with the condenser 11. While a particular example of the refrigerant system is shown, this application extends to other refrigerant system configurations, including configurations that do not include a chiller. For instance, the main refrigerant loop 17 can include an economizer downstream of the condenser 11 and upstream of the expansion device 15.

Figure 2:
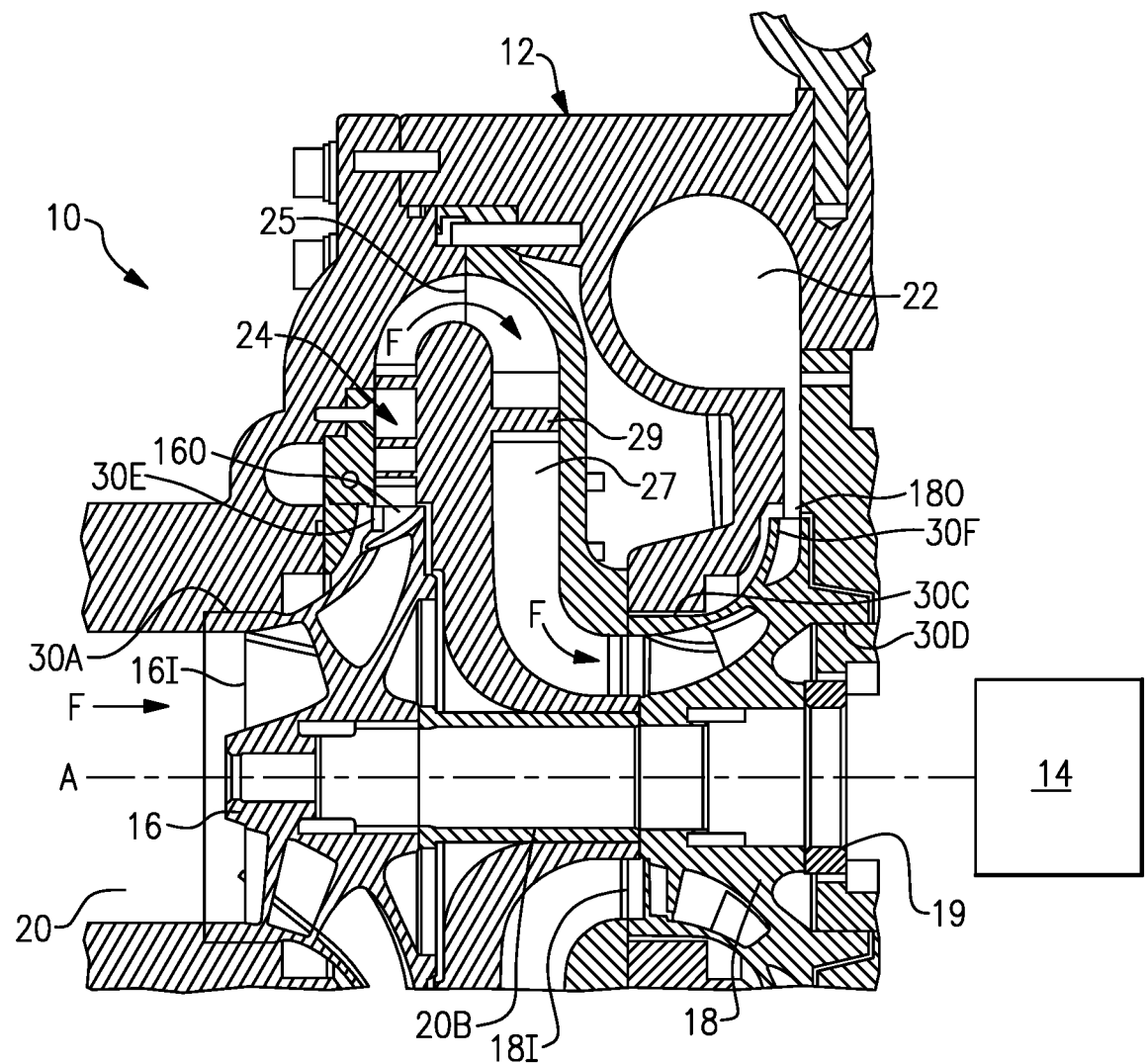
FIG. 2 shows a schematic view of a refrigerant compressor.

FIG. 2 illustrates a portion of an example refrigerant compressor 10 ("compressor 10"). The compressor 10 includes a housing 12, which encloses an electric motor 14. The housing 12 may comprise one or more pieces. The electric motor 14 rotationally drives at least one impeller about an axis A to compress refrigerant. Example refrigerants include chemical refrigerants, such as R-134a and the like. The motor 14 may be driven by a variable frequency drive. The compressor 10 includes a first impeller 16 and a second impeller 18, each of which is connected to the motor 14 via a shaft 19. In the illustrated example, the impellers 16, 18 are centrifugal impellers. While two impellers are illustrated, this disclosure extends to compressors having additional, or fewer, impellers. In some embodiments, the compressor 10 may have two axial compression stages, or mixed and axial compression stages.

The housing 12 establishes a main refrigerant flow path F. In particular, the housing 12 establishes an outer boundary for the main refrigerant flow path F. A first, or main, flow of refrigerant is configured to flow along the main refrigerant flow path F between a compressor inlet 20 and a compressor outlet 22. In the illustrated example, there are no inlet guide vanes disposed at the compressor inlet 20. The lack of inlet guide vanes reduces the number of mechanical parts in the compressor 10, which would require maintenance and/or replacement after prolonged use. In other examples, inlet guide vanes may be arranged near the inlet 20.

From left to right in FIG. 2, the main refrigerant flow path F begins at the compressor inlet 20, where refrigerant is drawn toward the first impeller 16. The first impeller 16 is provided in the main refrigerant flow path F, and is arranged upstream of the second impeller 18 relative to the main refrigerant flow path F. The first impeller 16 includes an inlet 161 arranged axially, generally parallel to the axis A, and an outlet 160 arranged radially, generally perpendicular to the axis A.

Immediately downstream of the outlet 160, in this example, is a first vaned diffuser 24. The main refrigerant flow path F extends through the diffuser 24 in a direction generally radially away from the axis A. Next, the main refrigerant flow path F turns 180 degrees in a cross-over bend 25, and flows radially inward through a return channel 27 toward the second impeller 18. Like the first impeller 16, the second impeller 18 includes an axially oriented inlet 181 and a radially oriented outlet 180.

The compressor 10 has a plurality of seals 30A-30F. The seals 30A-30F prevent the main refrigerant from escaping the flow path F. The seal 30A is located between an outer diameter of the first impeller 16 and the housing 12, near the inlet 161. The seal 30B is located between the shaft 19 and the housing 12 between the first and second impellers 16, 18. The seal 30C is located between an outer diameter of the second impeller 18 and the housing 12, near the inlet 181. The seal 30D is located at an inner diameter of the second impeller 18 and the motor 14. The seal 30E is located between an outer diameter of the first impeller 16 and the housing 12, near the outlet 160. The seal 30F is located between an outer diameter of the second impeller 18 and the housing 12 near the outlet 180. At least one of the seals 30A-30F is a labyrinth seal. In one particular embodiment, all of seals 30A-30F are labyrinth seals.

Labyrinth seals are used in turbomachinery to restrict or prevent the flow of gas or fluids between adjacent internal compartments with different pressures. A labyrinth seal prevents fluid flow from travelling from a higher pressure location to a lower pressure location. Labyrinth seals generally include a plurality of fins or teeth that define a plurality of cavities. The cavities entrap working fluid between a moving component and a stationary component. The trapped fluid thus creates a barrier that isolates a high pressure region within the machine from a region of lower pressure. In one example, the stationary and moving components are a stator and a rotor, such as an impeller.

Figure 3:
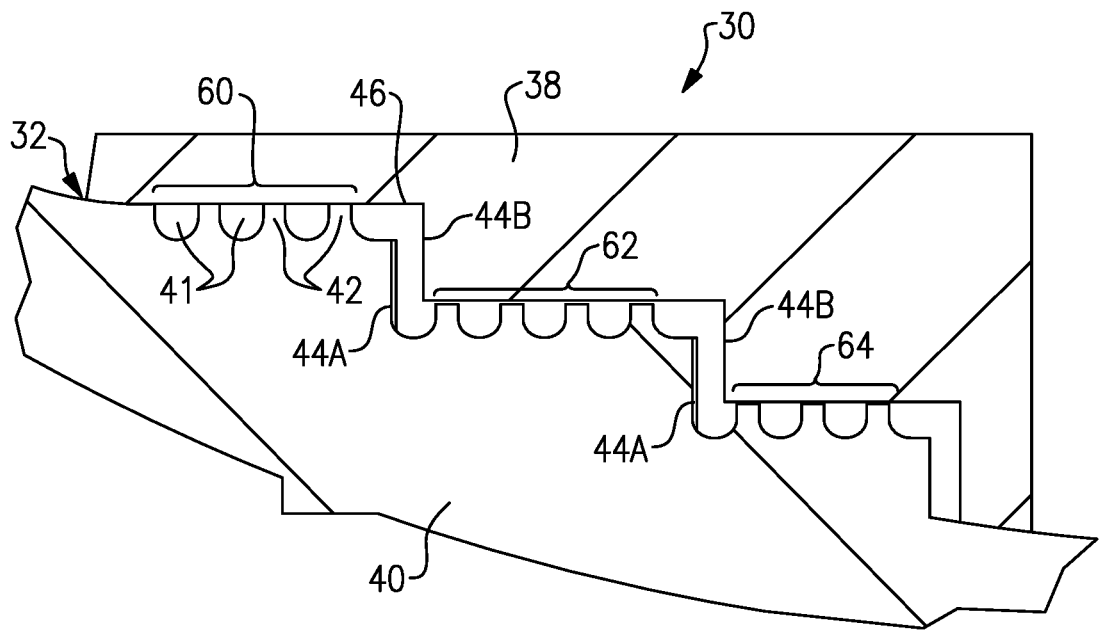
FIG. 3 shows an example labyrinth seal arrangement.

FIG. 3 shows an example stepped labyrinth seal 30, which is representative of any one of the seals 30A-30F. In the illustrated embodiment, a plurality of teeth 42 extend radially outward (i.e., in a direction normal to axis A) from a rotor 40 in a direction towards a stator 38 to define a plurality of cavities 41 between the teeth 42. In another embodiment, a plurality of teeth 42 extend outward from the stator 38. In some embodiments, the teeth 42 extend perpendicularly from the rotor 40, while in other embodiments, the teeth 42 extend diagonally from the rotor 40. The disclosed labyrinth seal reduces leakage flow by using a stepped arrangement and using abradable materials in the labyrinth seal.

The teeth 42 on the rotor 40 are arranged in a stepped arrangement, meaning some are arranged at a different radial position than others. In particular, in FIG. 3, the teeth 42 are spaced-apart radially by steps 44A. The steps 44A are formed such that the teeth are arranged in a first group 60, a second group 62, and a third group 64. The teeth 42 in each group 60, 62, 64 are at the same position in a radial direction relative to an axis of rotation of the rotor 40 (i.e., the axis A). The steps 44A and teeth 42 are cut out of the rotor 40 using known manufacturing techniques. Similar steps 44B are also cut into the stator 38 to align with the rotor 40. In the illustrated example, there are two of each steps 44A, 44B. The teeth 42 and the steps 44A, 44B introduce reverse flow, which stall refrigerant flow (such as trapping flow in the cavities 41), and help decrease total leakage.

The performance of the seal 30 depends on the labyrinth design and the radial clearance at the tips of the teeth 42. In some known labyrinth seals, it can be difficult to control the amount of radial clearance, because thermal gradients, centrifugal and gas pressure forces, and shaft flexing, among other things may cause deflections between the components. The stator 38 includes an abradable portion 46 that is formed from an abradable material. The abradable portion 46 helps to minimize clearance between the tips of the teeth 42 and the stator 38. The abradable portion 46 starts off at a very close clearance to the rotor 40 and teeth 42. The abradable portion 46 generally spans the length of the seal 30 and tracks the shape of the steps 44A in the rotor 40.

Figure 4:
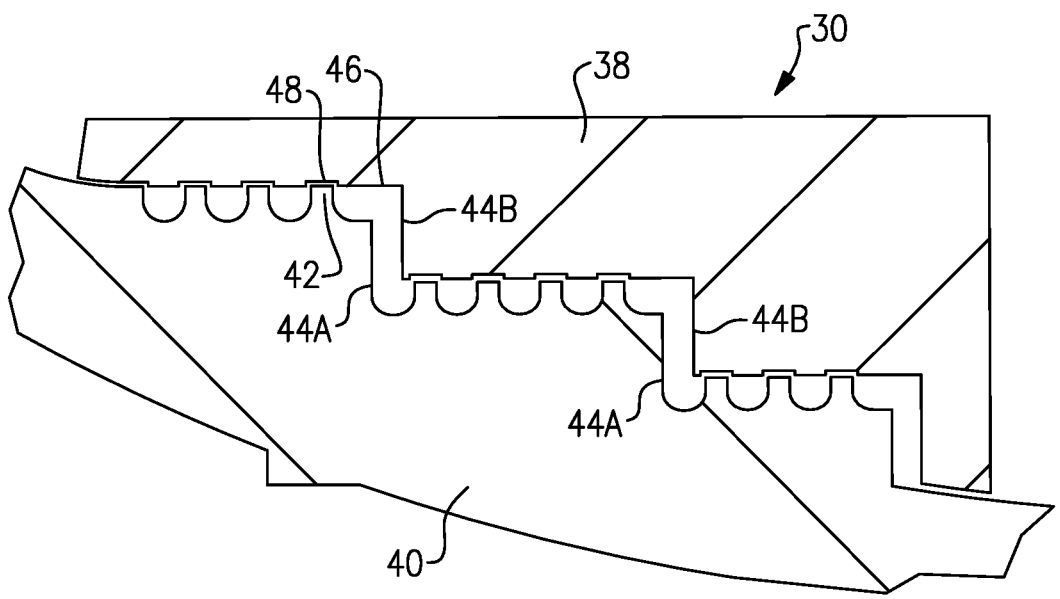
FIG. 4 shows the example labyrinth seal arrangement.

As shown in FIG. 4, the abradable portion 46 wears away as the compressor 10 runs over time. A track 48 is carved into the abradable portion 46 radially outward of each of the teeth 42. That is, as the rotor 40 rotates, the teeth 42 contact the abradable portion 46 and wear off some of the abradable portion 46 in the tracks 48 where the teeth 42 contacted the abradable portion 46. The tracks 48 provides a very small gap between the teeth 42 and the stator 38.

The abradable portion 46 is formed from an abradable material. Example abradable materials may include polytetrafluoroethylene ("PTFE"), polyamide, and other low strength alloys. The rotor 40 and teeth 42 are generally formed from a hard material that can wear away the abradable portion 46, such as an aluminum alloy, stainless steel, carbon steel, nickel alloy (such as Inconel), etc. The abradable portion 46 and the tracks 48 formed over time permit the minimum gap possible, which makes it more difficult for the flow to continue, and thus improve the sealing capability of the seal 30.

Figure 5:
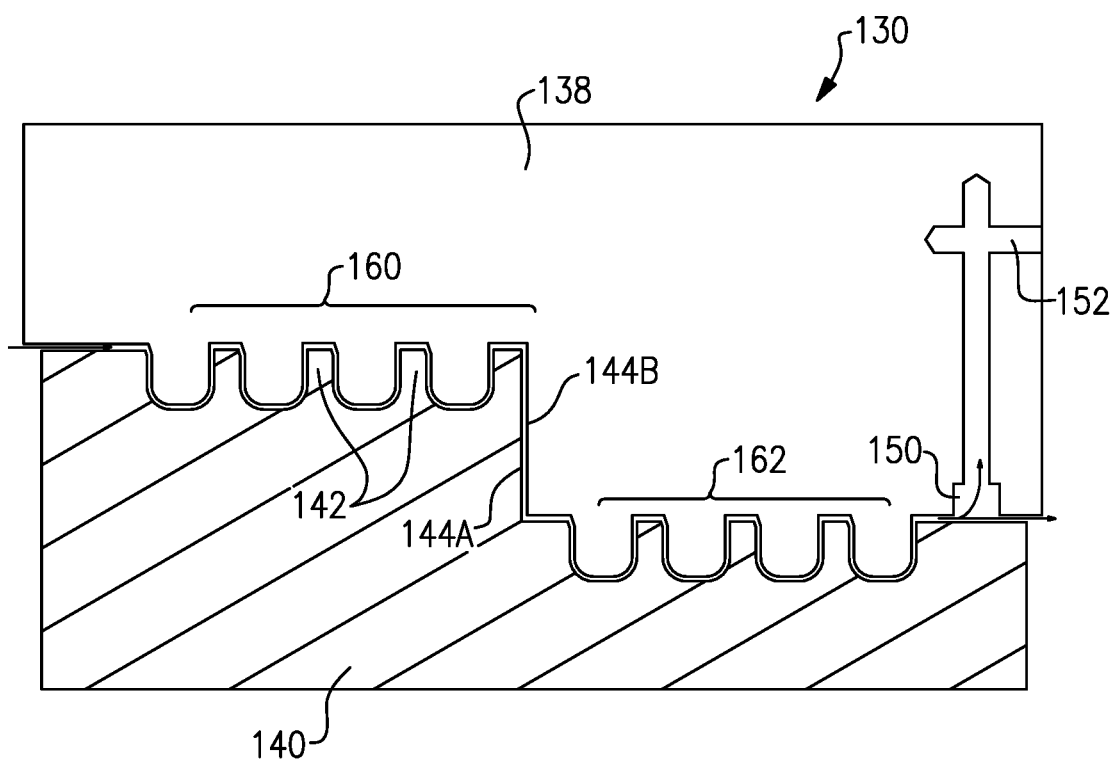
FIG. 5 shows another example labyrinth seal arrangement.

FIG. 5 shows another example labyrinth seal arrangement. In this example, the seal 130 includes a single step 144. That is, the teeth 142 form first and second groups 160, 162, respectively. The teeth 142 in each group 160, 162 are at the same position in a radial direction. Although one- and two-step labyrinth seals are shown, seals with additional steps may fall within the scope of this disclosure. To the extent not otherwise described or shown, the labyrinth seal 130 corresponds to the labyrinth seal 30 of FIGS. 3 and 4, with like parts having reference numerals preappended with a "1."

The use of abradable materials may result in debris as the abradable portion is worn down. Although the abraded amount may be small, the system may include high precision parts. For example, bearings, sensors, and power electronics within the system cannot have intrusion of contaminants. As such, in this example, a debris trap 150 may be arranged downstream of the teeth 142 to capture any debris from the abradable portion 146 as it is worn away. In some examples, the debris trap 150 is arranged on a discharge path 152 to redirect the debris away from any sensitive components downstream of the seal 130. This arrangement may help prevent debris from damaging other components in the system.

Any of the above described labyrinth seals 30, 130 may be used in any of the seal locations 30A-30F. In some examples, different types of labyrinth seals 30, 130 may be used in different seal locations 30A-30F within the same compressor 10.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A compressor, comprising:
   a rotor configured to rotate with respect to a stator, the stator having an abradable portion;
   at least one labyrinth seal between the rotor and the stator, wherein the labyrinth seal comprises a plurality of teeth extending from the rotor toward the abradable portion.

2. The compressor as recited claim 1, wherein the plurality of teeth are provided in a stepped arrangement.

3. The compressor as recited in claim 1, wherein the plurality of teeth are arranged in three groups separated by radial steps.

4. The compressor as recited in claim 1, wherein the abradable portion is made of one of PTFE, polyamide, and a low strength alloy.

5. The compressor as recited in claim 1, wherein the plurality of teeth are configured to contact the abradable portion and carve tracks into the abradable portion over time.

6. The compressor as recited in claim 1, wherein a flow path is defined through the labyrinth seal and a discharge path is arranged downstream of the labyrinth seal.

7. The compressor as recited in claim 1, wherein a flow path is defined through the labyrinth seal and a debris trap is arranged downstream of the labyrinth seal.

8. The compressor as recited claim 1, wherein the labyrinth seal is arranged at a first location, and a second labyrinth seal is arranged at a second location between the rotor and the stator.

9. The compressor as recited in claim 1, wherein the rotor comprises an impeller, the stator is a housing, and the labyrinth seal is arranged between an outer diameter of the impeller and the housing.

10. The compressor as recited in claim 1, wherein the rotor comprises an impeller and the labyrinth seal is arranged at an inner diameter of the impeller.

11. The compressor as recited in claim 1, wherein the rotor rotates on a shaft that is driven by a motor.

12. The compressor as recited in claim 1, wherein the compressor is a two stage compressor.

13. The compressor as recited in claim 1, wherein the compressor is used in a heating, ventilation, and air conditioning (HVAC) chiller system.

14. The compressor as recited in claim 1, wherein the plurality of teeth are configured to rotate together with the rotation of the rotor to gradually wear away the abradable portion.

15. The compressor as recited in claim 14, wherein the plurality of teeth are configured to rotate together with the rotation of the rotor to gradually form tracks in the abradable portion.

16. The compressor as recited in claim 1, wherein the plurality of teeth and the rotor are formed of the same material.

17. The compressor as recited in claim 16, wherein the plurality of teeth and the rotor are formed of a different material than the abradable portion.

18. A refrigerant system comprising:
    a main refrigerant loop including a compressor, a condenser, an evaporator, and an expansion device, wherein the compressor includes:
    a rotor configured to rotate with respect to a stator, the stator having an abradable portion; and
    at least one labyrinth seal between the rotor and the stator, wherein the labyrinth seal comprises a plurality of teeth extending from the rotor toward the abradable portion.

19. The refrigerant system of claim 18, wherein the plurality of teeth are provided in a stepped arrangement.

20. The refrigerant system of claim 19, wherein the plurality of teeth are arranged in at least two groups separated by radial steps.

21. The refrigerant system of claim 18, wherein the teeth are configured to contact the abradable portion and carve tracks into the abradable portion over time.

22. The refrigerant system of claim 18, wherein a flow path is defined through the labyrinth seal and at least one of a discharge path and a debris trap is arranged downstream of the labyrinth seal.

23. The refrigerant system of claim 18, comprising a second labyrinth seal between the rotor and the stator.

24. The refrigerant system of claim 18, wherein the compressor is a two stage centrifugal compressor.

* * * * *